Fig.-1

John W. Packie Inventor

FIG.-2

John W. Packie Inventor
By [signature] Attorney

Patented Mar. 11, 1952

2,589,124

UNITED STATES PATENT OFFICE 2,589,124

METHOD AND APPARATUS FOR HANDLING FLUIDIZED SOLIDS

John W. Packie, Maplewood, N. J., assignor to Standard Oil Development Company, a corporation of Delaware Application May 1, 1950, Serial No. 159,276

19 Claims. (Cl. 196—52)

This invention relates to the handling of finely divided solids in the fluidized state, and more particularly to systems wherein a fluidized solid material is used in the treatment, production, or conversion of hydrocarbons. It is applicable to systems wherein such a fluidized solid is continuously recycled between a reaction zone and a separate regeneration or reactivation zone, especially where the atmosphere in the reaction zone is different from that in the regeneration zone and no mixing of the atmospheres in the two zones can be allowed to take place.

Extensive commercial application of such systems has been made in the petroleum industry for the catalytic cracking of hydrocarbons. Equipment of the general type discussed herein is frequently referred to as a "two-vessel system" for handling fluidized solid. In the general problem of designing such a system, a number of different arrangements of vessels and transfer lines have been proposed. In considering these designs certain basic requirements must always be kept in mind. The first of these is that an adequate driving force must be provided for circulating the solid between the two vessels at the desired rate, with means for varying this driving force over the range required for satisfactory operating control. In addition to this, reliable means must be provided to prevent backflowing of the reactants from either vessel to the other through the transfer lines.

In the design of two-vessel systems of this type for use in the petroleum industry, especially in the catalytic conversion of hydrocarbons using a fluidized solid catalyst, the driving force commonly employed for circulating the catalyst from one vessel to the other has been the fluistatic head generated by a relatively dense column of aerated catalyst in a standpipe. In commercial plant design these standpipes have fed out of each vessel of the two-vessel system at or near the bottom, discharging through a variable orifice such as a slide valve. The rate of discharge of catalyst from the bottom of each standpipe is controlled by adjustment of the slide valve. Catalyst passing through these slide valves in each standpipe drops down into a lower pressure zone where it is picked up by a high velocity stream of a suitable fluidizing medium, which is commonly the reactant for the next stage of the cycle. This catalyst stream is then carried as a relatively low density or dispersed suspension through a transfer line leading up into the other vessel. The pressure drop through the slide valves is relied upon in each case to prevent the backflow of fluidizing medium from the lower pressure zone into the standpipe.

In the prior art there are various systems showing no slide valves, and where internal conduits or standpipes are provided to convey fluidized solid directly from one to another of two contacting zones arranged separately within the same outer shell. However, equipment of the type described in these patents has not been constructed and used commercially, despite the strong economic pressure tending in the direction of using the simplest possible construction and operating controls. The reason for this is that a study of these designs using internal standpipes, particularly where no slide valves are provided, has shown a lack of operating flexibility or a very narrow range of operability. A much more critical failing, coupled with the delicate pressure balance required to keep these systems in operation, is a lack of minimum adequate safeguards against an inadvertent "temporary" upset in operation which might reverse the direction of flow through one of the internal standpipes. In a catalytic cracking plant, this would produce a mixture of hydrocarbon and air in the same vessel at concentrations well within the explosive limits. Even the slightest admixture of this type cannot be tolerated in a system where a delicate pressure balance is being relied upon for safety, since the resulting abrupt increase in temperature and pressure might easily aggravate the condition of unbalance. None of the simplified systems of these prior art processes contains an adequate restorative force tending to maintain the desired rate and direction of flow in the case of such an upset, with a factor of safety sufficient to compensate for pressure fluctuations which normally occur in the operation of such equipment.

The narrow range of operability of these prior art designs is due to the fact that normal pressure fluctuations in the operation of a fluidized solid system are directly related to the linear velocity of the fluidizing medium. The smooth, quiet flow pattern which would be essential for the satisfactory operation of such equipment is obtained only at very low gas feed rates. In contrast to this condition, feed rates which are commercially attractive for catalytic conversion processes commonly result in the formation of a highly turbulent fluid bed within the contacting zone, characterized by temporary localized pressure fluctuations which are a substantial fraction of the total pressure drop across the bed. In any body of fluidized solid, a gas bubble or localized region of low density tends always to rise relative to the surrounding material. This tendency extends everywhere through the continuum except where there is a definite pressure drop barrier sufficient to deflect the rising bubble to another course. A vertically disposed and unobstructed internal standpipe open at its lower end offers no positive barrier against the upward passage of such a bubble through the standpipe, even though the density of the material confined within the standpipe is normally greater than that of the material outside. A bubble entering the confined space at its lower end will tend to pass upward unless the rate at which fluidized solid is passing down out of the standpipe is definitely greater than the rate of bubble rise. The immediate effect of any such bubble within the standpipe is to decrease the density differential which is the driving force for solid circulation, thus decreasing the rate at which the solid is delivered from the bottom of the standpipe and aggravating any tendency for bubbles to pass upward against the normal direction of flow. The same considerations apply to a simple external standpipe which is disposed vertically or at a small angle to the vertical direction so as to feed directly downward from one vessel to the other vessel at a lower level, or where the second vessel is placed beneath the first.

In any such unobstructed direct-feeding standpipe, this tendency for gas bubbles to interfere with the normal direction and rate of solid and gas flow is particularly serious when operations are carried out using a high linear velocity of fluidizing medium, and where this medium is introduced into the bed of fluidized solid at a level below the point where such a standpipe feeds into the bed. Under these conditions there is a high degree of turbulence within the fluid bed, the number and size of such gas bubbles or low density regions within the bed becomes quite large, and a bubble sufficiently large to completely cover the cross-sectional area of the bottom opening of the standpipe is almost certain to enter the standpipe to some extent. As the frequency of such encounters increases with increasing gas velocity, more and more bubbles, or portions of bubbles, will tend to pass upward into the high density zone. Thus, in a two-vessel system operating at anything above the lowest velocity for fluidization, such a direct-feeding internal or external standpipe may become a totally ineffective barrier against the back-mixing of fluidizing gas from one zone to the other unless a slide valve is used in conjunction with it.

According to the present invention, finely divided solid is circulated between two vessels without the use of control slide valves. In this apparatus I arrange each transfer line leading from one contacting vessel of a two-vessel system to the other in the form of a U-shaped tube comprising a standpipe section leading from one vessel through which the solids flow downwardly, a sealing section which forms the looped section of the U-tube adapted to contain a dense fluid body of solids with a minimum amount of gas necessary for aeration, where the pressure is higher than it is anywhere in the upper part of the system, and a riser section through which the solids flow upwardly to the other vessel. As a further feature of the invention, additional gas is introduced into the riser section in controlled amounts to regulate the rate of flow of the solids between the vessels. This transporting gas is introduced a substantial distance above the bottom section of the U-tube so that an effective sealing section positioned therebelow contains solids at maximum fluid density which forms a gas seal tending to prevent the back flow of gases from one vessel to the other.

The normal direction of solid flow in this arrangement is maintained by establishing a pressure differential across each of the U-shaped connecting lines such that the total pressure exerted on the solid in the downflow leg exceeds the total back-pressure exerted on the solid in the upflow leg. This, in turn, is accomplished by maintaining the density of the fluidized solid in at least one of the two risers substantially less than that in the corresponding downflow leg or standpipe section, and adjusting the top pressure in the two vessels to compensate for differences in the level of the catalyst beds within them. The U-bend seal at the bottom of each transfer line below the point where the reactant or transporting gas is introduced takes no part in building up the driving force for solid circulation, and operates essentially as a gas seal tube since the pressure generated by the downflowing or standpipe leg of the seal is substantially counterbalanced by the pressure drop on the upflowing side of the seal. The extent of the pressure differential between the top and bottom of each of the U-bend seal legs, is determined by the height and density of the fluidized solid contained within the seal. By this means it is possible to design the equipment with due regard for normal pressure fluctuations within either of the contacting vessels. According to my invention, the pressure differential within the U-bend seal sections measured from the point of reactant injection down to the bottom of the seal section, is maintained at a value which is more than adequate to compensate for normal pressure fluctuations, so as to provide an adequate safety factor.

The object of this invention is to provide an improved method of circulating a fluidized solid in a closed cycle between two contacting zones or vessels using different reactants or treating agents in the different zones, whereby a positive seal is provided against the improper transfer of reactant gas or agent from one vessel to the other. Another object is an improved method for controlling the rate of transfer of fluidized solid from one such contacting vessel to another in a closed cycle without the use of internal moving parts and without the use of control slide valves. Still another object is to minimize the tendencies to erosion and attrition incident to forcing a stream of fluidized solid through a restricted passageway, and at the same time to provide an improved method of reliably preventing any upset in the rate or direction of flow of solid in such a system due to temporary or local fluctuations of pressure in either contacting vessel. Other objects will appear in the description of the process and apparatus given below.

Having thus described the basic principles and objects of this invention, its application may be more clearly understood by reference to the attached drawings in which:

Figure 1:
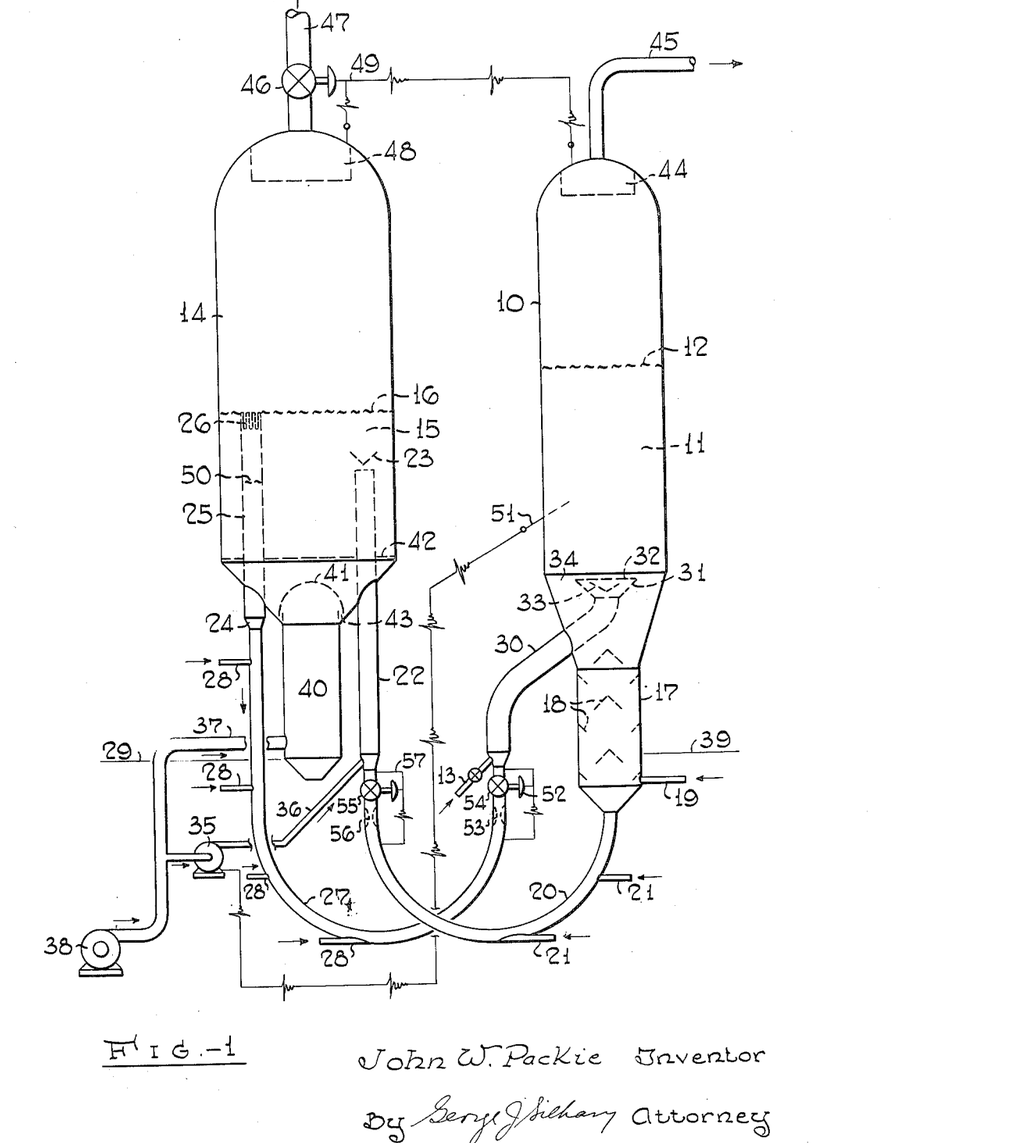
Fig. 1 is a diagrammatic representation of one form of apparatus adapted for practicing my invention and including a reactor and regenerator suitable for use in the catalytic cracking of hydrocarbons.

Referring now to Fig. 1 of the drawings, the system illustrated includes a vertically arranged cylindrical reaction vessel or reactor 10 containing a fluidized bed 11 of catalyst having a level indicated at 12, in which the hydrocarbons introduced at line 13 are undergoing catalytic cracking. Hydrocarbon gases or vapors passing upward through the fluid bed 11 maintain the bed in a dense turbulent fluidized condition having the appearance of a boiling liquid. A separate regeneration vessel or regenerator 14 arranged at approximately the same level as reactor 10 contains a similar fluidized bed 15 of catalyst having a level indicated at 16, which is undergoing regeneration to burn off carbonaceous deposits formed during the cracking reaction. The regeneration gas is an oxidizing gas, preferably air, which passes upward through bed 15 so as to maintain it in the dense turbulent fluidized condition.

The catalyst employed for this process may be a silica base catalyst prepared by the acid activation of bentonitic clays or a synthetic catalyst derived from silica gel or other forms of silicic acid. The catalyst may be of the silica-alumina or silica-magnesia type, with suitable additions of other active constituents such as zirconia, boria or the like. This catalyst may be in the form of a finely divided powder prepared by grinding or in the form of small spheres prepared by suitable drying procedures in the case of the synthetic catalysts. The catalyst contains preferably particles having a range of particle sizes, including particles within the size range from 0 to about 200 microns in diameter. The top pressure within the reactor may be about 6 to 10 lbs./sq. in. as determined by the back-pressure of the product recovery system, that is the pressure drop which the product vapors must overcome. The product recovery system, which may be of any suitable type, is not part of the present invention and is not shown in the drawing. The pressure in the top of the regenerator may be about 6 to 15 lbs., and the relationship between the reactor pressure and the regenerator pressure is an important operating control as indicated below in further detail. Both reactor pressure and the regenerator pressure may be increased considerably beyond the values shown here, by maintaining the proper relationship between them and may be 100 lbs./sq. in. or higher.

The feed stock for the catalytic cracking process may be a gas oil, naphtha, heavy distillate, topped crude, whole crude, or other fractions of crude oil separately or in combination, or the process may be applied to liquid hydrocarbons or hydrocarbon blends derived in part from sources other than petroleum.

The temperature of the cracking reaction may be within the range of between 700 to 1100° F., preferably 900 to 950° F. and the temperature of the regeneration may be between about 900 to 1200° F., preferably about 1100 to 1150° F. The system is adapted to be run under heat balance conditions, that is, substantially all of the heat liberated during regeneration is transmitted to the oil and utilized for vaporization and cracking thereof. The catalyst-oil ratio required to maintain this heat balance operation will vary with the characteristics of the feed stock, the temperature to which this feed stock is preheated by indirect heat exchange with various effluent streams from the cracking and regeneration processes and the cracking temperature desired. This catalyst-oil ratio may vary from about 5 to 1 to 30 to 1 parts by weight, and may be about 10 to 1 under preferred conditions.

Spent catalyst is withdrawn from reactor 10 and flows downward through a stripper 17 which may be provided with disc and doughnut baffles 18. A line 19 supplies stripping steam or other stripping gas into the bottom of the stripper. Catalyst withdrawn from the bottom of stripper 17 passes through U-bend seal section 20 into the connecting vertical riser 22. Riser 22 extends into the lower portion of the regenerator 14 and terminates within the upper portion of the fluid bed 15 therein below the level 16 of this bed. Aeration tapes 21 are provided in this U-bend seal section 20 which connects stripper 17 to upflow standpipe 22, to supply the minimum amount of steam or other aeration gas required to maintain fluidity in the seal section with maximum catalyst density. An inverted deflector cone 23 may be provided in bed 15 a short distance above the top of riser 22 to give improved distribution of the catalyst entering bed 15.

The catalyst level 16 within the regenerator is fixed by the open upper end of a downflow withdrawal standpipe 24, which extends up into regenerator 14. Catalyst from the fluid bed 15 overflows into the upper portion 25 of this standpipe 24, which has a larger diameter than the lower portion thereof to serve as a withdrawal well and provide surge capacity to accommodate small fluctuations in the rate at which the catalyst overflows. The total amount of the catalyst hold-up in the fluid bed 15 is thus substantially constant, subject to minor changes in the density or particle size distribution characteristics of the catalyst. Vertical slots 26 may be provided at the top of withdrawal well 25 to give a smoother rate of catalyst withdrawal, and to permit slight variations in catalyst level 16 without large fluctuations in the rate at which catalyst overflows into the withdrawal well.

Catalyst flowing downward through standpipe 24 and passing through U-bend seal section 27 is maintained at maximum fluid density, with the aid of the minimum amount of aeration steam or other gas introduced through aeration taps 28. The seal section 27, comprises that portion of the conduit connecting regenerator 14 with reactor 10 which lies below the horizontal plane where the oil injection line 13 enters the conduit 30. Catalyst flowing downward through standpipe 24 and seal section 27 then passes into the reactor 10, by way of the transfer line 30, which has a somewhat larger diameter than line 27 and joins line 27 at the level of oil injection line 13 above the U-bend which forms the seal section.

The gas oil or other hydrocarbon feed stock for the cracking process, which may be preheated by indirect heat exchange with various product streams or the regeneration vent gas in any suitable manner, is injected into line 30 through line 13 at a point just above the level where line 30 joins the U-bend seal leg 27. The oil and catalyst mixture formed by the injection of preheated liquid hydrocarbon through line 13 proceeds as a dilute dispersed suspension of cracking catalyst in oil vapors through line 30 into reactor 10. The very large increase in gas volume caused by the vaporization and expansion of the oil in this line by contact with the hot catalyst gives the resulting suspension a high velocity and low density. The velocity of the catalyst-oil suspension decreases upon entry into reactor 10. Thus, the density in the transfer line 30 may have a value within the limit of 2 to 10 lbs./cu. ft. whereas the catalyst density within bed 11 and stripper 17 may be about 20 to 35 lbs./cu. ft. and the density in standpipe 24 and seal sections 20 and 27 may be about 35 to 45 lbs./cu. ft.

Transfer line 30 passes through the side wall of reactor 10 near the top of stripping section 17, and terminates within the reactor in an inverted distributing cone 31. The dilute suspension of catalyst in oil in line 30 is introduced into the bottom of fluid bed 11 through perforated grid 32 arranged horizontally at the top of distributing cone 31. An inverted deflector cone 33 may be provided within distributing cone 31 and below grid 32 to give an improved distribution of catalyst and hydrocarbon vapors across the bottom cross-sectional area of fluid bed 11. The upper end of distributing cone 31 has a diameter smaller than the internal diameter of reactor 10 to form an annular space 34 through which catalyst can flow downward from reactor 10 into the upper part of the stripper 17.

In this arrangement the dense catalyst from regenerator 14 in downflow standpipe 24, including withdrawal well 25, functions in the usual manner to build up a fluistatic pressure within the standpipe, and the direction of catalyst flow from regenerator 14 to reactor 10 is maintained by the fluistatic pressure balance across seal section 27. Because of this pressure balance the fluistatic pressure exerted by the dense catalyst within standpipe 24 above the sealing section is substantially the same as the pressure on the riser side where the oil feed line 13 enters transfer line 30. Under these circumstances, catalyst falling into the withdrawal well 25 will cause an equal amount to be displaced into the transfer line 30. The density of the dense catalyst suspension in riser 22 leading to regenerator 14 can be controlled by the amount of gas injected through line 36, but in any case is substantially less than the density in the reactor and stripper so that the fluistatic pressure exerted on the downflow stream of catalyst at the bottom of stripper tends to exceed the fluistatic pressure on the upflowing catalyst at the bottom of riser 22.

The density of the catalyst in upflow standpipe 22 is controlled by injecting air from booster blower 35 or injecting steam or other gas at a controlled rate through line 36 entering the bottom of standpipe 22, just above the level where standpipe 22 connects with seal leg 20. An increase in the rate of air supplied by blower 35 thus results in an increase in the rate of catalyst circulation between the vessels, due to a decrease in the density of the column of catalyst in upflow standpipe 22 and a decrease in the fluistatic back pressure exerted by it. When air is used as the rate-controlling gas stream introduced through line 36, booster blower 35 may take suction from the main air line 37 supplying air to regenerator 14 from blower 38.

The driving force for catalyst circulation between the vessels in this system is derived from the fluistatic pressure balance as indicated above, in that the density of the catalyst mixture within downflow standpipe 24 substantially exceeds that in transfer line 30, and the density of the catalyst mixture in stripper 17 and reactor 10 substantially exceeds that in upflow line 22. Considering this balance more exactly, the total pressure on the reactor side of seal leg 20, which results from the gas pressure at the top of reactor 10 plus the fluistatic pressure of the catalyst in bed 11 and stripper 17, can be made to exceed the back pressure at the base of upflow standpipe 22 on the regenerator side of seal leg 20 which results from the pressure of the catalyst in upflow standpipe 22 plus the small pressure due to the portion of the catalyst in bed 15 above the point where line 22 enters regenerator 14 and the back pressure of the gas above bed 15 in the regenerator, causing a flow of catalyst which tends to equalize the pressure differential thus created. On the other hand, the gas pressure at the top of the regenerator plus the pressure of the catalyst within the downflow standpipe 24 exerted on the regenerator side of the U-bend seal 27, counterbalances the back pressure of the catalyst-oil suspension in transfer line 30 plus the fluistatic pressure of the catalyst in bed 11 and the back pressure at the top of the reactor and exceeds it only by the small difference in pressure equal to the frictional pressure drop.

The U-bend seal sections 20 and 27 constitute essentially that portion of the transfer lines leading from the reactor and regenerator which lies below the horizontal plane of gas injection line 36 and oil injection line 13 respectively. Thus, seal section 20 comprises the entire U-shaped line between line 36 where the rate-controlling gas stream enters riser 22 and the corresponding level 39 located in the downflowing stream of catalyst below reactor 10 at a point near the bottom of stripper 17. The fluistatic pressure at these two points tends to be equalized by the fluid behavior of the catalyst suspension between them. The upflow portion of this seal leg, between the bottom of U-bend 20 and air injection line 36, functions as a positive pressure seal opposing any forces which might tend to make air from upflow standpipe 22 flow back into the reactor 10 against the normal direction of flow. This sealing effect exists because the fluistatic pressure at the bottom of the U-bend is greater than it is at the point of air injection at 36. The downflow portion of seal leg 20 between level 39 and the bottom of the U-bend builds up a pressure head sufficient to counterbalance the pressure differential which produces the sealing effect in the upflow portion of seal leg 20, so that the net effect of the seal leg on catalyst circulation is that of a siphon tube.

Similarly, in seal leg 27, which extends from the level of oil injection line 13 to the corresponding point or level 29 in downflow standpipe 24, any tendency for oil vapors in the upflow transfer line 30 to travel in the reverse direction towards regenerator 14 is opposed by the fluistatic pressure head of the catalyst contained in the upflow portion of this seal leg between the level of injection line 13 and the bottom of the U-bend. Thus, there is no possibility for either the main regeneration gas stream injected through line 37 or the fluidization stream injected at line 36 to appear as gas bubbles at the bottom of the downflow leg of U-bend 20 leading down from the reactor side of the system without first overcoming the positive pressure seal established in the upflow leg of this U-bend. The same considerations apply to the oil vapors in transfer line 30, relative to U-bend 27 and standpipe 24 leading down from the regenerator.

The fluistatic pressure head of the catalyst contained within these U-bends thus serves as a positive seal against the back-mixing of oil from line 13 into regenerator 14 or air from line 36 into reactor 10. This sealing effect of these U-bends, located below the point of entry of the oil injection line 13 and the rate controlling gas line 36, provides a safety factor over and above the pressure head and velocity component of the catalyst flowing down into each seal leg. These latter factors in themselves are enough to maintain catalyst circulation in the desired direction in the absence of pressure fluctuations within the system, but they are not enough to reliably prevent an upset in this direction of flow due to normal pressure surges within the system. As indicated above, the depth of the seal legs required to accomplish this purpose must be sufficient to accommodate the pressure fluctuations which occur in normal operation. In conventional catalytic cracking plant designs, where slide valves are employed to control the rate of catalyst circulation, pressure surges of the order of two to three lbs./sq. in. are encountered, particularly in the dilute phase risers where catalyst dropping through the slide valve is picked up by the fluidizing medium for the next stage of the operating cycle and carried upward to the next contacting vessel in the form of a dilute dispersed suspension. In the operation of such a system the pressure drop across the slide valve is never less than about three lbs./sq. in. According to the present invention, slide valves are not employed to control the rate of catalyst circulation and the pressure drop which is required to prevent back-mixing of the gases from one contacting vessel to the other is provided by the U-bend seal leg below the level of introduction of the two fluidizing gases. Thus, for example, a fluidized catalyst having a density of 38 lbs./cu. ft. under minimum aeration conditions will require a standpipe height of approximately 3.8 feet per pound of pressure drop, and a height of 15 feet in these U-bend seals will provide a sealing pressure differential of about 4 lbs./sq. in. This may be compared with a total pressure drop of about 2 to 8 lbs./sq. in. across fluid beds 11 and 15 in the reactor and regenerator, depending upon the depth of these fluid beds and the density of the catalyst suspension within them.

An additional feature of my invention is the fact that the oil feed stream injected in line 13 enters transfer line 30 in the same direction of flow as the catalyst therein, so that there is no sharp change in the direction of catalyst flow either at the point of oil feed injection or at the point where the catalyst stream enters this transfer line. This concurrent flow of oil from line 13 and catalyst from line 27 through transfer line 30 into the reactor gives a smoother operation with much smaller pressure fluctuations at this point than those observed in the operation of conventional slide valve controlled equipment. Similarly in line 36 at the bottom of upflow standpipe 22, the flow of catalyst and the flow of gas introduced is colinear, so as to minimize pressure fluctuations which tend to occur due to the formation of slugs of poorly dispersed catalyst in the transfer line where there is a sharp change in the direction of solid flow at the point of gas injection. Pressure fluctuations in riser 22 are also minimized by keeping the column of catalyst therein in the form of a dense suspension rather than a dilute suspension. Any slugs of poorly dispersed catalyst persisting for a short distance within the upflow path of the solid within this standpipe will thus cause only minor local surges in pressure due to the density difference, in place of the sharp pressure surges which may occur where such a slug appears in a dilute phase transfer line.

The main supply of combustion air for the regeneration process is introduced into the bottom of regenerator 14 through line 37 from blower 38 and through auxiliary burner 40. Auxiliary burner 40 located at the bottom of regenerator 14 is used to supply heat to the catalyst during the starting-up period. For this purpose line 37 feeds directly into burner 40, and a separate supply of gaseous or liquid fuel not shown is provided during the starting-up. During normal operations no combustion takes place in this burner. A hollow hemispherical refractory hood 41 shielding the top of the outlet from burner 40 protects the metal gas-distributing grid 42 supporting fluid bed 15 from direct radiant heat while the burner is in use. The narrow clearance 43 between hood 41 and the projecting top of burner 40 provides a vapor trap and also gives the gas stream at this point a high velocity which helps to prevent any catalyst within the bottom cone of the regenerator below grid 42 from dropping down into the burner.

The construction of the auxiliary burner 40 is described in greater detail and is being claimed in applicant's continuation-in-part application Serial No. 233,228 filed June 23, 1951.

The design of the grid 42 supporting fluid bed 15 is preferably such that there is a sufficient pressure drop across this grid to prevent catalyst reflux through the openings therein, with the result that the cone at the bottom of regenerator 14 beneath grid 42 ordinarily runs free of catalyst at normal rates of air supply through blower 38. Upflow standpipe 22 is shown as projecting within fluid bed 15 to a level above grid 42, which adds the fluistatic pressure difference of the catalyst within this portion of the standpipe relative to that in fluid bed 15 to the driving force for catalyst circulation, and thus decreases the total elevation of the vessel required. In other cases, however, it may be desirable for standpipe 22 to terminate at the level of grid 42 or at a still lower level, such as at the point where it enters the bottom of regeneration vessel 14.

The top pressure inside reactor 10 above the fluid bed 11 contained therein may be about 9 lbs./sq. in., as indicated above, as determined by the back pressure in the product recovery system. Product vapors passing overhead from fluid bed 11 contain entrained catalyst particles which are separated from the product vapors by two or three stages of a suitable gas-solid separating means 44 such as a cyclone separator, multiclone or the like, and returned therefrom through dip legs leading back into bed 11. The product vapors are then conveyed through line 45 into the product recovery system. If desired, small amounts of residual entrained catalyst recovered in the product recovery system as a slurry of catalyst in oil may be returned to the cracking system by way of oil injection line 13 or at any other suitable point.

The top pressure on regenerator 14 above the fluid bed 15 contained therein may be about 11 lbs./sq. in., and is controlled by throttling valve 46 located in stack line 47 of the regenerator. Vent gases from the regeneration pass into stack line 47 by way of gas solid separating means 48 such as a cyclone separator, multiclone or the like, which may be arranged as a two-stage or three-stage separating system with dip legs to return the catalyst thus recovered into fluid bed 15.

The setting of valve 46 may be controlled by a differential pressure controller 49 suitably connected to the top of regenerator 14 and reactor 10 so as to maintain the desired pressure differential between the top of these vessels. The pressure differential between these vessels which forms part of the pressure balance within the system is thus kept at a constant value. While the present example is described in terms of a regenerator top pressure somewhat higher than the reactor top pressure, so as to realize certain advantages incident to regeneration at the higher pressure level, exactly the same principles may apply to an operation in which the two vessels are at the same top pressure or in which there are differences between them in either direction. It is also within the purview of my invention to operate with one of these vessels at a higher level than the other, with suitable adjustments in the top pressures and in the length of the two standpipes leading up to and down from the higher vessel.

The chief operating variables ordinarily relied upon to control the operation of this system include the air supply to upflow standpipe 22, the total amount and quality of the catalyst in the system, and the temperature and amount of oil fed into the injection line 13. To take full advantage of the regeneration capacity available, it is most economical to run the main air blower 38 at constant speed, at capacity, and make whatever adjustments are required in the reactor section to produce the amount of coke on catalyst which will keep the system in heat balance at the desired cracking temperature and maximum coke burning capacity. It is possible, however, to make adjustments in the rate at which main combustion air is supplied from blower 38, if such an adjustment is warranted under special circumstances.

While the total amount of catalyst hold-up in the fluid bed 15 within regenerator 14 is substantially constant due to the fixed level 16 at the top of withdrawal well 25, the catalyst within the withdrawal well finds a free level 50 somewhat below the level 16 of bed 15, depending upon the rate of catalyst circulation and the pressure differentials established elsewhere in the system. The existence of such a free level permits considerable adjustments in the circulation rate without throwing the system out of pressure balance, and the difference between level 50 and level 16 is a measure of the reserve driving force for catalyst circulation which permits such adjustments.

The catalyst hold-up within the reactor is controlled directly by the total inventory of catalyst within the system. Changes in this catalyst inventory to produce a change in the level of fluid bed 11 within reactor 10 may be made by the addition of makeup catalyst or withdrawal of spent catalyst at any suitable point, such as in standpipe 22 leading to the regenerator. A portion of the catalyst withdrawn in this way may be discarded to make room for fresh catalyst to be added to maintain the desired level of activity in the total circulating stream, or it may all be stored for reuse.

The temperature within reactor 10 is normally controlled by controlling the circulation rate of catalyst through the system. In order to accomplish this, the rate at which air is supplied to standpipe 22 by booster blower 35 is controlled by a temperature indicator 51 located at a suitable point in bed 11. In case the reactor temperature thus determined tends to fall below the desired value, this mechanism is arranged so as to increase the air supply to standpipe 22, decreasing the density of the catalyst suspension therein and increasing the rate of catalyst circulation. With a higher rate of catalyst circulation, more hot catalyst per unit time overflows into well 25 from regenerator 14 and is conveyed into reactor 10, increasing the reactor temperature and the severity of cracking for a given oil feed rate so as to give additional coke on catalyst and a higher rate of heat production when this coke is burned from the catalyst in the regenerator 14. Too high a reactor temperature, on the other hand, will act through the same mechanism to cause a decrease in the air supply to standpipe 22, resulting in a decrease in catalyst circulation rate, less heat supply to the reactor, and less coke produced per unit of time. The amount of oil fed through line 13 and the temperature to which this feed stock is preheated before injecting it into the catalyst stream can also be adjusted to control reactor temperature. This oil preheat may vary from about atmospheric temperature to 750° F. or higher, and is ordinarily within the range from about 400° to 650° F. Cracking severity, which determines product distribution and product quality, is a factor of all these variables, including the feed rate, type, and temperature of the oil feed stock, and the circulation rate, activity, and temperature of the catalyst stream entering the reactor.

As a safety feature for this operation, the flow of catalyst from the upflow leg of U-bend 27 into transfer line 30 is measured by a pressure drop controller 52 across venturi 53. Safety shut-off valve 54 which operates fully open under normal conditions, may also be arranged in line 20 at this location. No throttling action is provided by this valve which operates either fully open or fully closed, and Venturi construction 53 is constructed so as to create only the lowest pressure drop which can be reliably measured, of the order of a few tenths of a pound. Controller 52 is connected to valve 54 in such a way as to shut off the flow of catalyst completely if the pressure drop across venturi 53 indicates that the flow is falling below a certain predetermined minimum value. This may be about 50% of the normal flow rate, or it may be set at the minimum rate of hot catalyst flow necessary to provide the heat required for vaporizing the oil feed stock injected through line 13. Safety shut-off valve 55, venturi 56 and controller 57 perform similar functions in the upflow leg of U-bend 20 just below the air injecting line 36 entering upflow standpipe 22. In both cases the controller measures the pressure drop across the venturi and valve fitting, and the venturi and valve fitting may be combined in one unit if desired.

As an additional safety feature, flow rate controllers not shown may be provided on oil feed line 13 and air feed lines 36 and 37, with emergency aeration lines to automatically cut in a supply of steam or other inert gas at these points in case the oil feed rate or the air feed rate drops below the safe minimum value to maintain fluidity, or in case the valves 54 and 55 close due to any upset in normal operation such as a drastic decrease in catalyst flow rate. This feature is particularly important at the oil injection point, since the loss of gas velocity at this point may result in the formation of a dense phase suspension in transfer line 30 with severe slugging and some tendency to plug the transfer line with a heavy slurry oil and catalyst. Suitable check valves not shown may also be supplied in the various air and steam injection lines, to prevent any tendency for fluidized catalyst to enter these lines in case of a failure of line pressure.

Figure 2:
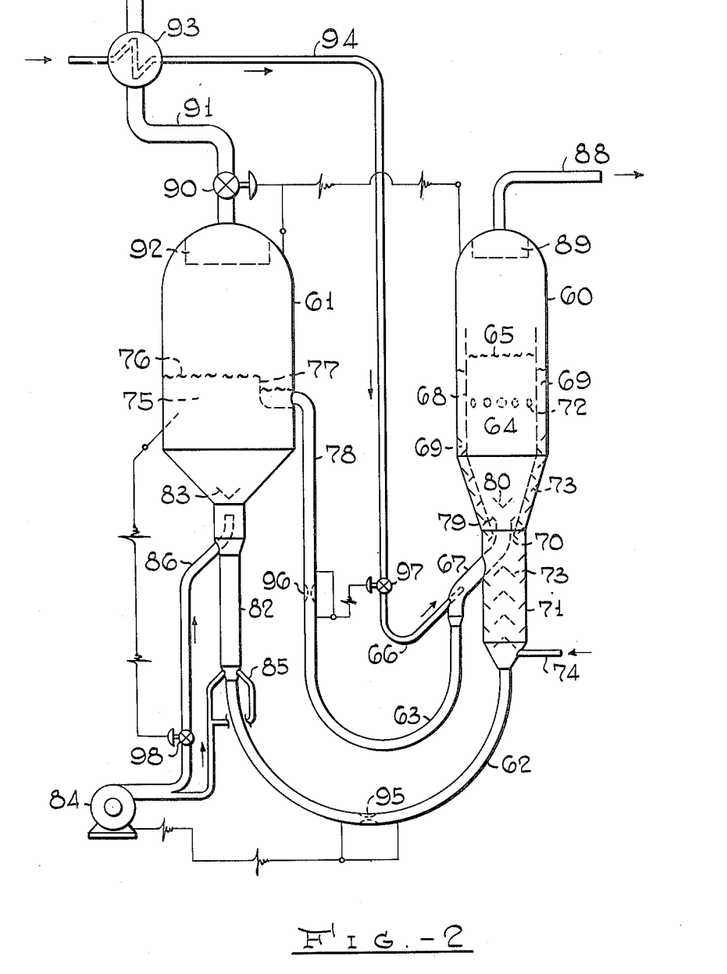
Fig. 2 is an alternate design embodying the same fundamental principles.

Fig. 2 shows a different embodiment of my invention employing the same principles of catalyst density control pressure differentials to provide catalyst circulation and U-bend seal legs to prevent the back-mixing of gases, without the use of grids to support the fluid beds of catalyst in the reactor and the regenerator.

The equipment illustrated in this drawing includes a reactor 60 and regenerator 61 connected by transfer lines, including U-shaped seal sections 62 and 63 located at a level below the bottom of the reactor and regenerator. Reactor 60 contains a fluid bed 64 of catalyst having a level indicated at 65. Hydrocarbon feed stock for the catalytic cracking process is injected through line 66 into transfer line 67 leading into the bottom of the reactor.

Reactor 60, which has a cylindrical side wall and a cone-shaped bottom, is provided with an annular stripping space arranged within the reactor and an extended stripper arranged below it. A false shell 68 having a cylindrical top section and a cone-shaped bottom section is suspended symmetrically within the reactor, spaced away from the side wall and bottom so as to form an annular stripping space 69. Transfer line 67 which serves as an inlet for catalyst and oil into the reactor passes through the bottom of the conical section of shell 68 with a close fit between the transfer line and the shell but not necessarily a seal fit, so that some catalyst flow may take place at this point 70 into the extended stripper 71 arranged below reactor 60. The major part of the catalyst enters the combined annular and extended stripper through orifices 72 arranged around the circumference of the cylindrical section of shell 68. The annular stripping space below the orifices 72 is preferably provided with baffles 73, as is the extended stripper section 71. A suitable source of steam or other stripping gas is provided through line 74 at the bottom of the stripping section.

In some cases it may be found that either the annular stripping device or the extended stripper, as shown above, may be sufficient without using both devices and it is within the purview of my invention to employ either type of stripping means without the other. If the annular stripper is to be used without the extended stripper, a simple vertical standpipe may be provided in place of the stripper 71 to connect with U-bend seal, section 62 below the level of reactor 60.

Regenerator 61 contains a fluid bed 75 of catalyst having a level as indicated at 76, undergoing regeneration by combustion to remove carbonaceous deposits formed during the cracking process. Level 76 is fixed by the overflow of catalyst from fluid bed 75 into stationary catchpan 77. Catalyst thus withdrawn flows through the downflow standpipe 78 into U-bend seal section 63, and thence into the reactor by way of transfer line 67 which terminates in an inverted distributing cone 79. An inverted deflector cone 80 is arranged above the inlet point to cooperate with distributing cone 79 in giving a more even distribution of catalyst and reactant hydrocarbon across the bottom area of fluid bed 64.

Catalyst withdrawal standpipe 78, which is shown as an external standpipe in the drawing, may, if desired, extend vertically downward through the fluid bed 75 and pass through the bottom portion of regenerator 61 instead of extending immediately through the side wall as an external standpipe.

Stripped catalyst withdrawn from the bottom of the stripping section passes through U-bend seal section 62 into the upflow standpipe 82 which opens directly into the bottom of fluid bed 75 within the regenerator 61. Inverted deflector cone 83 may be arranged above the open upper end of upflow standpipe 82 to give a more even distribution of the catalyst stream entering at this point. Deflector cone 83, as well as deflector cone 80, may be constructed in the form of an inverted cone having a small central opening and an outer diameter somewhat larger than the diameter of the catalyst stream impinging upon it. Such a construction permits a portion of the catalyst stream to circulate continuously through the cone so that there is no dead space above it, and deflects the remainder circumferentially so as to give a much more uniform distribution of catalyst and gas across the cross-sectional area of the vessel than that which is obtained by allowing the stream to pass directly into the fluid bed without any distributing grid or deflecting baffles.

The primary control over the rate of catalyst circulation in this equipment, as in the case of the modification previously discussed in connection with Fig. 1, is obtained by controlling the density of the catalyst suspension in the riser 82 leading into regenerator 61. As in the previous example, this may be accomplished by delivering variable amounts of the main air supply from blower 84 to the bottom of upflow standpipe 82 through air injection lines 85, while the remainder of the regeneration air supply is introduced into the regenerator through a separate line 86.

The various standpipes risers and seal legs in this design operate in essentially the same manner as that described above in connection with Fig. 1. The top pressure in reactor 60 is determined by the back pressure on the product recovery system, not shown, and product vapors are removed from the top of the reactor by way of product line 88 after passing through suitable gas-solid separating means 89 to remove entrained catalyst and return it through suitable dip legs into fluid bed 64. The pressure differential between reactor 60 and regenerator 61, if any, is maintained at a constant desired level by a pressure sensitive device connected to the top of both vessels and controlling the opening of throttling valve 90. Valve 90 is located in stack line 91 which removes spent regeneration gases from regenerator 61 after they have passed through gas-solid separating means 92 to remove entrained catalyst. A heat exchanger 93 may be located in stack line 91 to preheat the hydrocarbon feed stock introduced through line 94 by indirect heat exchange with the flue gases from the regenerator. Under certain circumstances it may be desirable to use a so-called double tube sheet heat exchanger at this point in place of the simple exchanger shown diagrammatically in the drawing. Such an exchanger prevents mixing of the heat exchanging fluids upon failure at the point where the tubes pass through the header tube sheet. For this purpose, a narrow space vented to the atmosphere is provided between two separate tube sheets supporting the tubes, one tube sheet serving to seal the header space, the other to seal the exchanger space.

As an operating safety control, Venturi flow indicator 95 may be provided in the spent catalyst seal section 62 to operate a cut-off on the main air blower 84 and thus discontinue the air flow in case the rate of catalyst flow falls below a predetermined minimum value. A similar Venturi indicator 96 may be arranged in the regenerated catalyst seal leg 63 to actuate valve 97 in oil feed line 94 and cut off the oil feed to injection line 66 in case the catalyst flow in seal section 63 falls below the predetermined minimum. The air rate controller 98, which determines the relative amount of the regeneration air supply introduced through line 85 and 86 at the bottom and top of riser 82 respectively, may be actuated by a temperature controller placed in the regenerator 61 as shown here, or in reactor 60 as in the case of the modification described in Fig. 1.

It will be appreciated that various incidental elements from these two designs may be used in combination: thus, for example, either the annular stripper or the external regenerated catalyst standpipe of Fig. 2 may be used in place of corresponding elements of the design shown in Fig. 1, and various advantages may be found for operating without distributing and supporting grids 32 and 42 in a manner similar to that described in connection with Fig. 2.

As a specific example of densities and pressure differentials suitable for operation in a system of this type, a catalytic cracking plant designed according to Fig. 1 and using a synthetic silica-alumina catalyst in the form of spray-dried micropheres having a size distribution of 7% 0–20 microns, 15% 20–40 microns, 66% 40–80 microns and 12% 80+ microns may have a reactor top pressure of 9.8 lbs./sq. in., a reactor bed density of 28 lbs./cu. ft. for a reactor bed depth of 25 ft., a catalyst density of 32 lbs./cu. ft. for a 16 ft. depth through stripper section 17, a pressure of about 18.1 lbs./sq. in. at the level of stripping gas inlet 19, and a density of 38 lbs./cu. ft. in seal section 20 as well as in seal leg 27 and downflow standpipe 24; under these conditions the regenerator top pressure may be about 11.2 lbs./sq. in., with a catalyst density of 23 lbs./cu. ft. for a 13 ft. depth in fluid bed 15, giving a 13.3 lbs./sq. in. pressure at the level of grid 42 and a 16.3 lbs./sq. in. pressure at the level of air injection line 36 when the density of the suspension in upflow standpipe 22 is about 17 lbs./cu. ft. and the density of the dilute suspension in transfer line 30 is about 6 lbs./cu. ft. Under these conditions the pressure drop across fluid bed 11 in the reactor is about 4.8 lbs./sq. in., the pressure drop across fluid bed 15 in the regenerator is about 2.0 lbs./sq. in. and the catalyst level 50 within withdrawal well 25 is about 7 ft. below the level 16 of bed 15. The height of the seal legs below oil injection line 13 and air injection line 36 above the bottom of U-bends 27 and 20 respectively is about 15 ft., which is enough to build up a fluistatic sealing pressure of about 4 lbs./sq. in. in each. A seal section height as low as about 7.5 ft. to give a 2 lb. pressure sealing effect might be a sufficient safety factor in systems of this type where pressure fluctuations are very low. In other cases, correspondingly longer seal legs may be used to allow for larger pressure fluctuations, especially in operations carried out at higher vessel pressures or with a greater difference between the operating pressures in the two vessels.

By virtue of the U-bend seal sections described, both of these designs are suited for use in catalytic cracking plants operating at superficial gas velocities considerably higher than those used in present commercial practice. The specific data shown in the above example are suitable for operation in the preferred velocity range of about 2.5 to 3.0 ft./sec. in both the reactor and regenerator. This process will operate equally as well at lower velocities as low as the minimum aeration velocity of the catalyst, which may be within the range from about 0.1 to 0.5 ft./sec., and higher velocities may be employed up to about 6 to 8 ft./sec., which is considerably above the free falling velocity of the catalyst particles employed.

While this process has been described in terms of a specific silica alumina catalyst, other cracking catalysts may be equally suitable. In general, the figures given here relate to operation with ordinary cracking catalysts. With catalysts or solids having much higher or lower density, the densities and velocities given will vary but the same principles of fluistatic pressure control will apply. The temperatures, feed rates and severity of cracking employed do not form any part of my invention and are not limiting thereon.

While the above discussion has described, by way of example, the specific application of my invention to systems for the catalytic cracking of hydrocarbons, it will be appreciated that the same basic principles may be employed to advantage in a variety of other applications. Thus, the invention is adapted for the hydroforming of naphthas, and other important uses may be found in the field of the catalytic conversion of gases or vaporized materials wherever it is necessary to regenerate a finely divided solid catalyst at frequent intervals by oxidation, reduction, sulfurization or other special treatment after it becomes spent during the conversion period. An example of the many non-catalytic processes in which such a system may be used is in the thermal cracking heavy carbonaceous materials such as reduced crude using a recycle stream of inert solid as a heat carrier. Another example is in the treatment of a stream of mixed gaseous or liquid hydrocarbons with silica gel, activated charcoal, or other suitable solid adsorbents for the removal and recovery of a desired constituent from such a mixture by selective adsorption. Another example is the distillation of oil from oil shale, where the spent shale may be roasted in a stream of oxidizing gas in a separate vessel and recycled to the distilling vessel to provide heat for the distillation of more oil from the fresh shale introduced. Other uses may involve the carbonization of coal, the roasting of ores, the reduction of metal oxides, or the transfer of heat between fluid streams by means of solids.

From the above description still other modifications and applications of my invention will be apparent to those skilled in the art of handling fluidized solids.

What I claim is:

1. In a process involving the contacting of separate gaseous streams with finely divided solid in two separate contacting vessels containing fluidized beds of said finely divided solid and wherein said finely divided solid flows from one of said vessels to the other through a U-shaped conduit interconnecting said vessels and having the bottom loop of said conduit extending a substantial distance below the bottom of said vessels; the method of controlling the rate of flow of solids between said vessels without the use of mechanically controlled valves while maintaining an effective gas seal therebetween which comprises flowing said finely divided solid from one of said vessels downwardly through one leg of said U-shaped conduit while in admixture with an aerating gas in an amount limited to maintain a dense fluidized body of solids in said downflowing leg, continuing the passage of said solid around the base of said conduit and upwardly through a substantial portion of the opposite leg without substantially changing the density of said fluid body, thereafter intermixing additional gas with the solid passing through the remaining and substantial section of said opposite leg in amount sufficient to materially reduce the density of said fluid body in said remaining section, flowing the resulting intermixture into the other of said vessels and regulating the amount of gas so intermixed to control the rate of flow of the solid between said vessels.

2. A process defined in claim 1 wherein the depth of the said dense fluidized body in said legs below the intermixing of said gas is sufficient to build up a fluistatic pressure between the point of intermingling additional gas and the base of the U-shaped conduit of at least 2 lbs./sq. in.

3. The process defined by claim 1 wherein the normal fluistatic pressure at the point of intermixing said additional gas is at least 2 lbs. per square inch greater than the pressure at the point of introduction of said intermixture into said other vessel.

4. In a process for the catalytic conversion of hydrocarbons wherein the hydrocarbons are converted in a conversion vessel in contact with a dense turbulent fluidized bed of finely divided solid catalyst, wherein the catalyst is regenerated in a separate regeneration vessel containing a dense turbulent fluidized bed of catalyst undergoing regeneration by the passage of regeneration gas therethrough, and wherein the catalyst is circulated between said vessels through two U-shaped conduits extending a substantial distance below the bottoms of said vessels; the improvement in the method of maintaining a gas seal between said vessels while controlling the rate of flow therebetween without the use of mechanically controlled valves which comprises overflowing catalyst from the upper level of the bed in said regeneration vessel into the open end of one of said conduits, passing the catalyst downwardly through one leg of said U-shaped conduit while in admixture with an aerating gas in an amount limited to maintain a fluidized body of catalyst in said leg having a density greater than the density of the fluidized bed within said regenerator; continuing the passage of the fluidized body around the base of the U-shaped conduit and upwardly through a substantial section of the opposite leg without substantially changing the density of said body, transferring catalyst from the top of said upflowing leg to said conversion vessel, withdrawing catalyst from said conversion vessel into the open end of the other of said interconnecting U-shaped conduits, passing the catalyst downwardly through one leg of said other conduit while in admixture with an aerating gas in an amount limited to maintain a fluidized body of catalyst in said downflowing leg having a density greater than the density of the fluidized bed in said conversion vessel, continuing the passage of the dense fluidized body around the base of said other U-shaped conduit and upwardly through a substantial portion of the opposite leg of said other conduit without substantially changing the density thereof, intermixing additional gas with the catalyst passing through the remainder and substantial section of said opposite leg to materially reduce the density of the mixture, transferring the resulting intermixture from the top of said opposite leg to said regeneration vessel and regulating the amount of gas so intermixed to control the rate of flow of the solids between said vessels.

5. A process defined by claim 4 wherein a differential pressure is maintained between said regeneration vessel and said conversion vessel sufficient to establish a level of fluidized solids in the downflowing leg of said first-named conduit a substantial distance below the level of the fluidized bed in said regeneration vessel.

6. In a process defined by claim 4 the further improvement which comprises maintaining the depth of the fluidized body of solids below the point of injection of additional gas into said other conduit sufficient to generate a fluistatic pressure between the point of gas admixture and the base of the conduit of at least 2 lbs./sq. in.

7. The process defined in claim 4 wherein the temperature in the regenerating vessel is maintained above the temperature in the conversion vessel, the rate of circulation of the catalyst between said vessels is controlled to maintain the desired temperature within the conversion vessel and wherein the amount of catalyst contained in the system is adjusted to maintain the desired quantity of catalyst in the conversion vessel.

8. The process defined in claim 4 wherein a predetermined differential pressure is maintained between the top of the conversion vessel and the top of the regenerator vessel.

9. An apparatus of the class described which comprises an enlarged vessel adapted to contain a fluidized layer of finely divided solids in the lower portion thereof, means for introducing a fluid stream into the lower portion of said vessel, means for withdrawing gaseous reactants from the upper end of said reaction vessel, a second vessel adapted to contain a fluidized layer of finely divided solids in the lower portion thereof, means for introducing a second fluid stream into the lower portion of said second vessel, means for removing gases from the upper end of said second vessel, means for transferring finely divided solid from the first-named vessel to the second vessel, said last-named means comprising a U-shaped conduit having one end terminating in the lower portion of the first-named vessel, a section of enlarged diameter and of substantial length at the opposite end terminating within said second vessel, the bottom loop of said U-conduit extending a substantial distance below the bottom of said vessels, means for introducing a transporting gas into the base of said section of enlarged diameter and at a point a substantial distance above the loop section of said conduit, means for varying the amount of transporting gas so introduced to control the flow of solid between said vessels and means for maintaining the solids in the transfer conduit upstream from the point of admission of the transporting gas in a dense fluidized state.

10. The apparatus defined in claim 9 which further comprises means for maintaining the depth of the layer in one of said vessels substantially constant.

11. The apparatus defined in claim 10 wherein the upper end of the transfer conduit above the point of admission of the transporting gas is of substantially greater diameter than the lower loop section of said conduit.

12. An apparatus defined in claim 11 including means for maintaining a predetermined difference in pressure between the upper ends of said vessels.

13. An apparatus for the catalytic conversion of hydrocarbons which comprises an enlarged conversion vessel adapted to contain a dense fluidized layer of finely divided conversion catalyst, means for introducing hydrocarbons to be converted in admixture with conversion catalyst into the bottom portion of said conversion vessel, means for removing gaseous conversion products from the upper end of said vessel, an enlarged regeneration vessel adapted to contain a dense fluidized layer of conversion catalyst, means for introducing a regeneration gas into the lower section of said regeneration vessel below said layer, means for removing spent regeneration gas from the top of said regeneration vessel, two U-shaped conduits interconnecting said vessels and adapted for the transfer of catalyst therebetween, one of said U-shaped conduits having one leg connecting with the intermediate portion of the regeneration vessel into which regenerated catalyst is adapted to overflow, the opposite leg of said conduit communicating with the conversion vessel and adapted to introduce regenerated catalyst into said conversion vessel, a loop section of said conduit extending a substantial distance below the level of said vessels, the upper end portions of said conduit being of substantially greater diameter than the remaining portion, means for introducing hydrocarbons to be reacted into the leg of said conduit communicating with said conversion vessel, said means being positioned a substantial distance above the loop section of the conduit and a substantial distance below the bottom of said conversion vessel, means for maintaining the conversion catalyst in the conduit upstream from the point of admission of said hydrocarbons in a dense fluidized condition, distributing means disposed within said conversion vessel adapted to distribute hydrocarbons and catalyst over a substantial horizontal area of said vessel, a second U-shaped conduit having an open end of one leg in open communication with said conversion vessel, the open end of the opposite leg extending to said regeneration vessel and terminating at an intermediate point therein, the loop section of said second conduit extending a substantial distance below the bottom of said vessels, said second conduit serving to transport spent catalyst from said conversion vessel to said regeneration vessel, the upper section of the leg of the second conduit connected to said regeneration vessel being of substantially greater diameter than the loop section thereof, means for introducing a transporting gas into said enlarged section and means for controlling the amount of transporting gas so introduced to regulate the rate of flow of catalyst between said vessels.

14. The apparatus defined in claim 13 wherein the upper end of the first-named conduit connected with said regeneration vessel has a serrated edge to minimize fluctuations in the rate of overflow of catalyst from the regeneration vessel into said conduit.

15. The apparatus as defined in claim 14 which further comprises means for maintaining a predetermined pressure differential between the upper ends of said conversion and regeneration vessels.

16. The apparatus as defined in claim 15 which further comprises means responsive to the temperature in the conversion vessel to control the amount of transporting gas introduced into said second-named conduit.

17. The apparatus defined in claim 16 which further comprises means disposed between the layer of catalyst in the conversion vessel and said second-named conduit for stripping hydrocarbons from catalyst prior to passing the same through said conduit to said regeneration vessel.

18. The apparatus defined in claim 17 wherein the means for introducing the hydrocarbon into one of said conduits and transporting gas to the other of said conduits is positioned at least 15 feet above the bottom loop section of said conduit.

19. In a process for the conversion of hydrocarbons wherein the hydrocarbons are converted in a conversion vessel in contact with a dense turbulent fluidized bed of solid in finely divided form, wherein the solid is subjected to further treatment in a second treating zone containing a dense turbulent fluidized bed of said solid undergoing treatment, and wherein the solid is circulated between said conversion and treating vessels through two U-shaped conduits extending a substantial distance below the bottom of said vessels, the improvement which comprises overflowing catalyst from the upper level of the fluid bed in said treating vessel into an enlarged open end of one of said conduits, passing the solid downwardly through one leg of said conduit while in admixture with an aerating gas in an amount limited to maintain a fluidized body of solid in said leg having a density substantially greater than the density of the fluidized bed within said treating vessel, continuing the passage of the fluidized solid around the base of the U-shaped conduit and upwardly through a substantial section of the opposite leg without substantially changing the density of said body, thereafter intermixing the solids with hydrocarbons to be converted in an amount sufficient to form a dilute suspension of hydrocarbon vapors and solids, transferring the resulting suspension into the bottom portion of the conversion vessel, withdrawing solids from said conversion vessel into an enlarged open end of a second interconnecting U-shaped conduit, introducing a stripping gas into said enlarged section to remove hydrocarbon vapors from said solids, passing the stripped solids downwardly through a further portion of said U-shaped conduit while in admixture with an aerating gas in an amount limited to maintain a dense fluid body of catalyst in said last-named downflowing section having a density substantially greater than the density of the fluidized bed in said conversion vessel, continuing the passage of a dense fluidized solid around the base of said second U-shaped conduit and upwardly through a substantial section of the opposite leg of said second conduit without substantially changing the density thereof, thereafter intermixing said solid with a transporting gas, passing the resulting mixture while in dense phase condition upwardly through the remaining and substantial section of second U-shaped conduit, passing the resulting dense phase into the treating vessel at an intermediate level therein and regulating the amount of transporting gas so intermixed to control the rate of flow of the solids between said vessels to thereby control the rate of flow without the use of any mechanically operated valves.

JOHN W. PACKIE.

REFERENCES CITED

The following references are of record in the file of this patent:

UNITED STATES PATENTS

| Number | Name | Date |
|---|---|---|
| 2,311,564 | Munday | Feb. 16, 1943 |
| 2,394,814 | Snuggs | Feb. 12, 1946 |
| 2,398,489 | Arveson | Apr. 16, 1946 |
| 2,425,754 | Murphree et al. | Aug. 19, 1947 |